(12) United States Patent
Moyer

(10) Patent No.: US 10,922,230 B2
(45) Date of Patent: Feb. 16, 2021

(54) SYSTEM AND METHOD FOR IDENTIFYING PENDENCY OF A MEMORY ACCESS REQUEST AT A CACHE ENTRY

(71) Applicant: Advanced Micro Devices, Inc., Sunnyvale, CA (US)

(72) Inventor: Paul James Moyer, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 23 days.

(21) Appl. No.: 15/211,547

(22) Filed: Jul. 15, 2016

(65) Prior Publication Data

US 2018/0018264 A1    Jan. 18, 2018

(51) Int. Cl.
| | | |
|---|---|---|
| *G06F 12/08* | (2016.01) | |
| *G06F 12/10* | (2016.01) | |
| *G06F 12/0844* | (2016.01) | |
| *G06F 12/0895* | (2016.01) | |
| *G06F 12/0868* | (2016.01) | |
| *G06F 12/1027* | (2016.01) | |
| *G06F 12/0831* | (2016.01) | |
| *G06F 12/0811* | (2016.01) | |

(52) U.S. Cl.
CPC ...... *G06F 12/0844* (2013.01); *G06F 12/0868* (2013.01); *G06F 12/0895* (2013.01); *G06F 12/0811* (2013.01); *G06F 12/0831* (2013.01); *G06F 12/1027* (2013.01); *G06F 2212/1021* (2013.01); *G06F 2212/281* (2013.01); *G06F 2212/313* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 6,430,654 B1 | 8/2002 | Mehrotra et al. | |
| 10,331,561 B1 * | 6/2019 | Shilane | G06F 12/0895 |
| 2002/0188807 A1 * | 12/2002 | Chaudhry | G06F 12/0813 |
| | | | 711/128 |

(Continued)

FOREIGN PATENT DOCUMENTS

EP    2866148 A1    4/2015

OTHER PUBLICATIONS

International Search Report and Written Opinion dated Oct. 23, 2017 for PCT Application No. PCT/US2017/041935, 10 pages.

(Continued)

*Primary Examiner* — Masud K Khan

(57) ABSTRACT

A processing system indicates the pendency of a memory access request for data at the cache entry that is assigned to store the data in response to the memory access request. While executing instructions, the processor issues requests for data to the cache most proximal to the processor. In response to a cache miss, the cache controller identifies an entry of the cache to store the data in response to the memory access request, and stores an indication that the memory access request is pending at the identified cache entry. If the cache controller receives a subsequent memory access request for the data while the memory access request is pending at the higher level of the memory hierarchy, the cache controller identifies that the memory access request is pending based on the indicator stored at the entry.

17 Claims, 5 Drawing Sheets

(56) References Cited

U.S. PATENT DOCUMENTS

| | | |
|---|---|---|
| 2006/0015689 A1 | 1/2006 | Okawa et al. |
| 2007/0067572 A1 | 3/2007 | Jiao et al. |
| 2011/0271057 A1* | 11/2011 | Karlsson ............. G06F 12/0855 |
| | | 711/122 |
| 2014/0089600 A1 | 3/2014 | Biswas et al. |
| 2015/0121011 A1 | 4/2015 | Huang |
| 2016/0299700 A1* | 10/2016 | Day ..................... G06F 3/0611 |
| 2016/0321182 A1* | 11/2016 | Grubisic ............. G06F 12/0833 |

OTHER PUBLICATIONS

International Preliminary Report on Patentability dated Jan. 24, 2019 for corresponding International Application No. PCT/US2017/041935, 7 pages.

Extended European Search Report dated Feb. 21, 2020 for European Application No. 17828465.9, 7 pages.

* cited by examiner

SYSTEM AND METHOD FOR IDENTIFYING PENDENCY OF A MEMORY ACCESS REQUEST AT A CACHE ENTRY

BACKGROUND

Description of the Related Art

To support execution of instructions at a processor, a processing system typically includes a memory subsystem consisting of memory modules to store data to be accessed by the executing instructions. To facilitate processing efficiency, the memory subsystem can be organized into a memory hierarchy having main memory at the top of the hierarchy to store all data that can be accessed by the executing instructions, and one or more caches at lower levels of the memory hierarchy to store subsets of the data stored at main memory. To further enhance processing efficiency, the processing system can implement a memory management protocol that governs the fetching of data from main memory to the one or more lower levels of memory through one or more cache controllers. For example, if data required by the processor is not found at a cache of the memory hierarchy (referred to as a "cache miss"), the cache controller issues a memory access request to retrieve the data from a different level of the memory hierarchy, such as from a different cache or from main memory.

To prevent the issuance of multiple memory access requests for the same data from a given level of the memory hierarchy, which can waste processor resources, the cache controller stores the memory address corresponding to each unit of data that is the subject of a pending memory access request in a buffer. When a subsequent request for the same data is presented to the cache controller, upon determining that the data is not present in the corresponding level of the memory hierarchy, the cache controller typically queries the buffer to determine whether the memory address of the data being requested is stored there. If the main memory address for the requested data is present in the memory buffer, indicating that a request for the data is already pending, the cache controller will not issue an additional request for the data. However, the memory buffer requires a relatively large amount of space, and can consume a relatively large amount of power.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
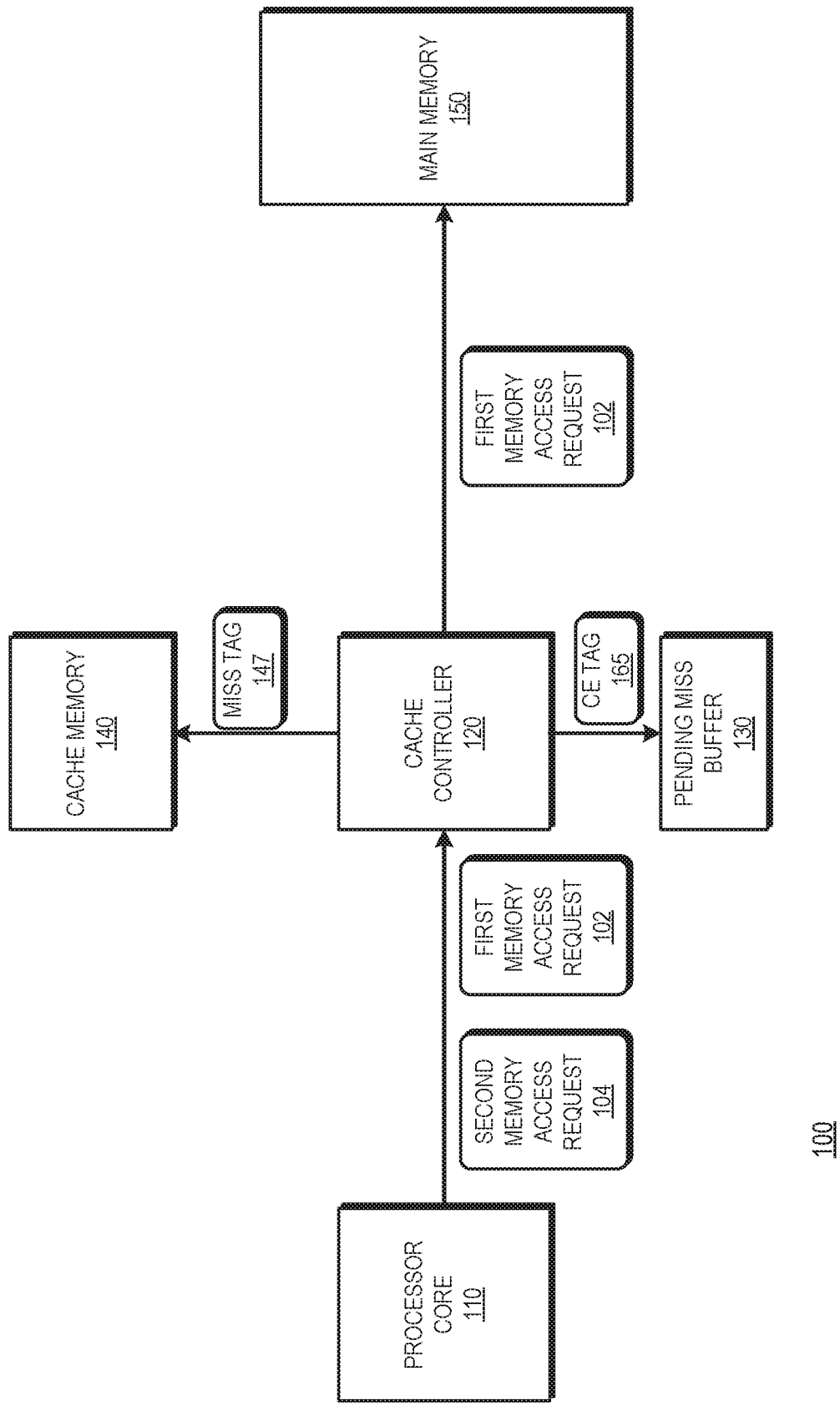
FIG. 1 is a block diagram of a processing system that records an indication of the pendency of a memory access request at a cache entry that is to store data responsive to the memory access request in accordance with some embodiments.

FIGS. 1-7 illustrate techniques for improving memory management efficiency by indicating the pendency of a memory access request for data at the cache entry that is assigned to store the data in response to the memory access request. The processing system includes a processor and a memory hierarchy, including main memory at the top of the hierarchy, and one or more caches of memory at lower levels of the memory hierarchy to store subsets of the data stored at main memory. While executing instructions, the processor issues requests for data to the cache most proximal to the processor. In response to a cache miss, a cache controller issues a memory access request for the data to a higher level of the memory hierarchy. Further, the cache controller identifies an entry of the cache to store the data in response to the memory access request, and stores an indication that the memory access request is pending at the identified cache entry. If the cache controller receives a subsequent memory access request for the data while the memory access request is pending at the higher level of the memory hierarchy, the cache controller identifies that the memory access request is pending based on the indicator stored at the entry. By employing the cache entry that is to store the data, rather than a separate miss address buffer, to store the indicator of the pendency of the memory access request, the processor is able to save both circuit area and power.

To illustrate via an example, one of the caches of the processor (e.g., a level 3 (L3) cache) is located in the memory hierarchy just below the main memory of the processing system. During the time that data that is the subject of a cache miss at the L3 cache is being fetched from main memory, subsequent requests for the same data may be presented to the L3 cache. In order to avoid creating additional memory access requests for the same data while a memory access request for the data is pending, which would consume system resources without improving processor performance, the cache controller of the L3 cache immediately assigns a cache entry to store data while the data is being fetched from main memory, and also stores at the cache entry an indicator that a memory access request for the data is pending at the main memory. In some embodiments, the indicator is a miss tag including the main memory address of the data being fetched as well as status information indicating that the data is the subject of a pending memory access request. The cache controller also stores in a side structure, such as a buffer, a cache entry tag comprising a data identifier and location information for the assigned cache entry.

If a subsequent request for the same data is received at the L3 cache while the data is still in the process of being fetched from main memory, the cache controller checks the cache memory to determine whether the data is already stored at the cache memory, and identifies that the cache entry stores the miss tag, indicating that the requested data is already the subject of a memory access request. In response, the cache controller places the memory access request in a pending state to await the storage of the data at the cache entry.

Once the requested data has been retrieved from the main memory, the cache controller queries the side structure for the data identifier for the retrieved data to determine if a cache entry tag corresponding to the data identifier is present. Upon reading the cache entry tag corresponding to the data, the processing system stores the retrieved data at the cache entry indicated by the cache entry tag, and updates the status information to a valid state to indicate that the data is now present in the cache. In addition, the cache controller satisfies any pending memory access requests that target the data. Thus, the L3 cache uses the cache entry itself to store the indicator of the pendency of the memory access request, rather than a separate buffer, thereby saving both power and circuit area.

FIG. 1 illustrates an example of a processing system 100 configured to store an indication of the pendency of a memory access request at a cache entry that is to store data responsive to the memory access request in accordance with some embodiments. As such, the processing system 100 may be employed in any of a number of devices, such as a personal computer, workstation, mobile device such as a smartphone, a video game console, smart TV and the like. As described further herein, the processing system 100 includes a processor core 110, one or more levels of cache memory (e.g., cache memory 140), a cache controller 120, a pending miss buffer 130, and a main memory 150.

The processor core 110 includes one or more instruction pipelines to execute instructions, organized in the form of computer programs, thereby carrying out tasks on behalf of an electronic device. While the processor core 110 may have some amount of integral memory, for example, in the form of registers, such memory is typically limited in storage capacity. Accordingly, in order to execute instructions, the processor core 110 stores and retrieves data from the memory hierarchy of the processing system 100, including the one or more levels of cache memory (herein represented as a single level of cache memory 140) and main memory 150. In particular, in the course of executing instructions, the processor core 110 generates operations, referred to as memory access requests 102, to store (a store operation) or load (a read operation) data from the memory hierarchy. The one or more levels of cache memory 140 and main memory 150 work together to satisfy the memory access requests 102, as described further herein.

The cache memory 140 is a memory module that stores data for access by the processor core 110. In at least one embodiment, the cache memory 140 includes a set of entries, each of which stores an associated unit of data, referred to as a cache line. In some embodiments, each of the one or more levels of cache memory 140 are set associative caches, wherein each cache is divided into a number of sets. Each set includes a number of data positions, or ways, with each way corresponding to a cache entry that stores a cache line. Each set only stores a cache line associated with subset of memory addresses, wherein the subset associated with a set is identified by the corresponding cache controller based on a portion of the memory address referred to as the index. By employing set associativity, the one or more levels of cache memory 140 facilitate relatively quick identification of cache misses and cache hits.

The cache controller 120 is a module configured to receive memory access requests 102 for data from the processor core 110 and search the cache memory 140 to determine if one of the cache entries stores a cache line associated with the memory address targeted by the memory access request 102. If the requested cache line is found in the cache memory 140, a cache hit has occurred. In the event of a cache hit, the cache controller 120 satisfies the memory access request 102 by, in the case of a read operation, providing the requested cache line from the cache memory 140 to the processor core 110 or, in the case of a write operation, storing the write data to the cache entry.

If the requested cache line is not found in the cache memory 140, a cache miss has occurred. In the event of a cache miss at the cache memory 140, the cache controller 120 provides the memory access request 102 to the main memory 150. In response to the memory access request 102, the main memory 150 retrieves the cache line at the main memory address targeted by the request 102 and provides the cache line to cache memory 140, where the memory access request 102 is satisfied.

In some embodiments, the cache memory 140 is sized such that it cannot store, at a given point in time, all the data that is requested by the processor core 110, thereby requiring data to be transferred through the memory hierarchy as described above. Each time a cache miss occurs and the requested cache line must be fetched from main memory 150, the retrieval of the cache line from main memory takes time, during which the processor core 110 may receive one or more additional requests for the same cache line. To reduce the inefficiency that would result from generating multiple memory access requests for the same cache line while an outstanding access request for the cache line is pending, the processing system 100 tracks outstanding access requests at the cache memory 140.

To illustrate, in operation, the processor core 110 sends a memory access request 102 to the cache controller 120, which searches the cache memory 140 for the requested cache line. If the requested cache line is found in the cache memory 140, it is provided to the processor core 110. If the requested cache line is not found in the cache memory 140, the cache controller 120 provides the memory access request 102 to the main memory 150.

While the requested cache line is in the process of being retrieved (fetched) from main memory 150 by the processor core 110, the cache controller 120 assigns a cache entry to the cache line that is being fetched. In some embodiments, the cache controller 120 assigns the cache entry corresponding to the cache set and way in which the cache line will be stored once it has been retrieved from main memory 150. The cache controller 120 stores at the cache entry a miss tag 147 including the main memory address of the cache line that is being fetched, and a status bit indicating that the cache line is the subject of a pending cache miss. The cache controller 120 also stores in as a pending miss buffer 130 a cache entry (CE) tag 165 including the data index and location information concerning the cache entry that has been assigned to the cache line that is being fetched. For example, in some embodiments, the cache controller 120 stores in the pending miss buffer 130 a cache entry tag 165 including the data index and the cache way that has been assigned in cache memory 140 to the cache line that is being fetched.

The pending miss buffer 130 is a memory module that stores cache entry tags 165 including data index and cache entry location information for cache entries that have been assigned by the cache controller 120 to store cache lines that are the subject of outstanding access requests. In some embodiments, the pending miss buffer 130 is configured to store cache entry tags including the data index and cache way that has been assigned for each cache line that is in the process of being fetched from main memory 150. In some embodiments, each cache entry tag in the pending miss buffer 130 including a data index and assigned cache way is smaller (i.e., requires fewer bits) than the full main memory address of the cache line that is in the process of being fetched from main memory 150.

In the event that, while the first memory access request 102 for the cache line is still in the process of being fulfilled from main memory 150, a subsequent memory access request 104 for the cache line is received by the cache controller 120 from the processor core 110, the cache controller 120 searches the cache memory 140 to determine if one of the cache entries contains the cache line associated with the memory address targeted by the subsequent memory access request 104. In this event, the cache controller 120 identifies at the cache entry the main memory address of the cache line that is being fetched and the status bit indicating that the cache line is the subject of a pending cache miss. Based on its reading of the status bit, the cache controller will not forward the subsequent memory access request 104 for the requested cache line to the main memory 150, but will instead resume its other tasks.

When the main memory 150 retrieves the cache line at the main memory address targeted by the request and provides the cache line to cache memory 140, the cache controller 120 compares the data index of the cache line against the cache entry tags 165 stored in the pending miss buffer 130. The cache controller matches the data index of the cache line to the stored cache entry tag, and reads from the cache entry tag 165 the cache entry in the cache memory 140 that has been assigned to store the cache line. The cache controller 120 stores the cache line at the previously assigned set and way of the cache entry and updates the status bit to a valid state, indicating that the cache line is present in the cache memory 140.

Figure 2:
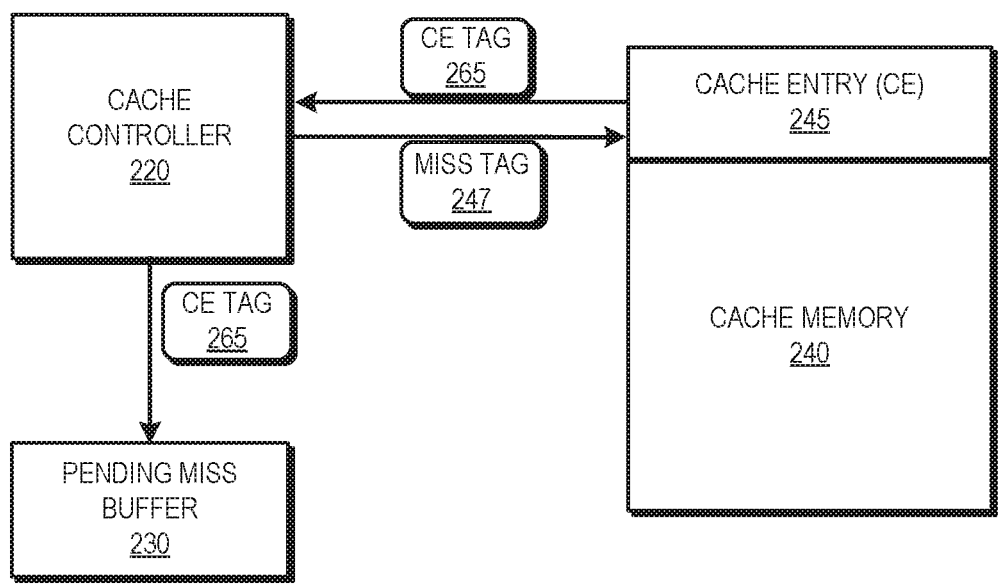
FIG. 2 is a block diagram of an example of the processing system of FIG. 1 storing a miss tag at a cache entry and storing a cache entry tag in a pending miss buffer to indicate the pendency of a memory access request in accordance with some embodiments.

FIG. 2 illustrates an example of the cache controller 220 storing a miss tag 247 at a cache entry 245 in cache memory 240 in response to a cache miss, and generating and storing a cache entry tag 265 in the pending miss buffer 230. The cache controller 220 receives a request for a cache line from the processor (not shown), and searches the cache memory 240 to determine if one of the cache entries stores a cache line associated with the memory address targeted by the memory access request. In this example, the requested cache line is not present in the cache memory 240, so the cache controller 220 provides the memory access request to the main memory (not shown). While the memory access request to the main memory is pending, the cache controller 220 assigns a cache entry 245 to the cache line that is the subject of the pending memory access request and generates a miss tag 247 including the main memory address of the cache line and a status bit indicating that the cache line is the subject of a pending memory access request. The cache controller 220 stores the miss tag 247 at the assigned cache entry 245 in the cache memory 240.

The cache controller 220 also generates a cache entry tag 265 including the data index for the cache line that is the subject of the pending memory access request and the cache entry 245 that it has assigned to the cache line. The cache controller 220 stores the cache entry tag 265 in the pending miss buffer 230. Typically, a cache entry has a status bit, which indicates whether the cache entry is filled with a valid cache line. In this example, the miss tag 247 stored at the cache entry 245 includes a status bit indicating that the data associated with the main memory address stored in the miss tag 247 the subject of a pending memory access request (a "miss pending").

Figure 3:
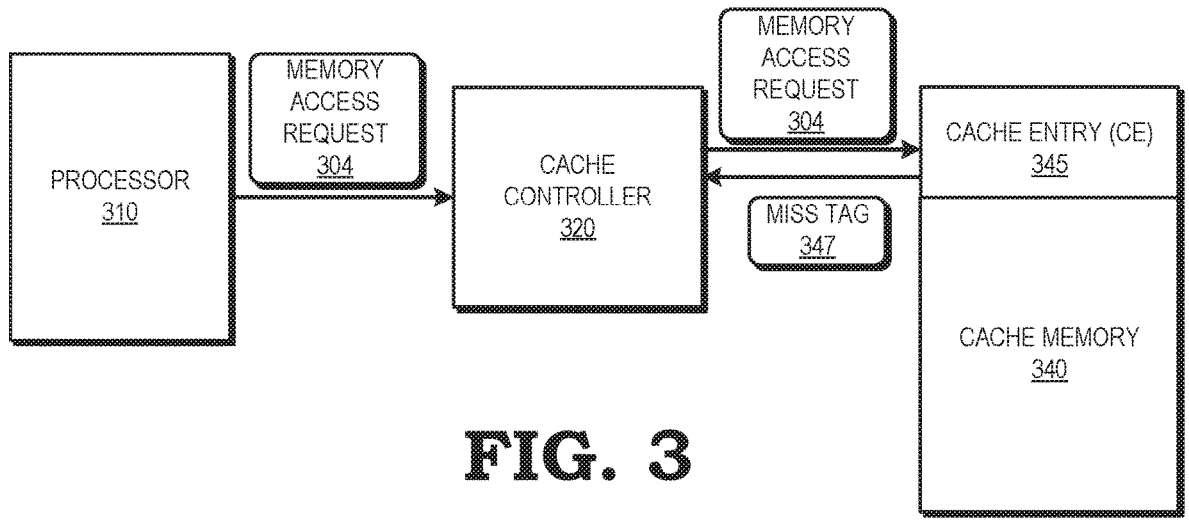
FIG. 3 is a block diagram of an example of the processing system of FIG. 1 receiving identifying the pendency of a memory access request for data based on identifying a miss tag at a cache entry in accordance with some embodiments.

FIG. 3 illustrates an example of the processor 310 issuing a subsequent request 304 to the cache controller 320 for a cache line that is the subject of a pending memory access request in accordance with some embodiments. The cache controller 320 receives the subsequent request 304 and searches the cache memory 340 for the requested cache line. The cache controller 320 matches the main memory address of the requested cache line to the miss tag 347 that is stored at the cache entry 345. The cache controller 320 reads the status bit (not shown) of the miss tag 347 and determines that the requested cache line is already the subject of a pending memory access request.

Having determined that the requested cache line is already in the process of being retrieved from main memory (not shown), the cache controller 320 treats the result of the search of the cache memory 340 as a cache hit that has already been copied to the processor (not shown), and resumes its other tasks without creating an additional request to main memory for the requested cache line. Because the cache controller 320 is able to determine from its search of the cache memory 340 that the requested cache line is the subject of a pending miss, the cache controller 320 does not need to check the pending miss buffer (not shown) to determine whether the requested cache line is the subject of a pending miss, thereby conserving power.

Figure 4:
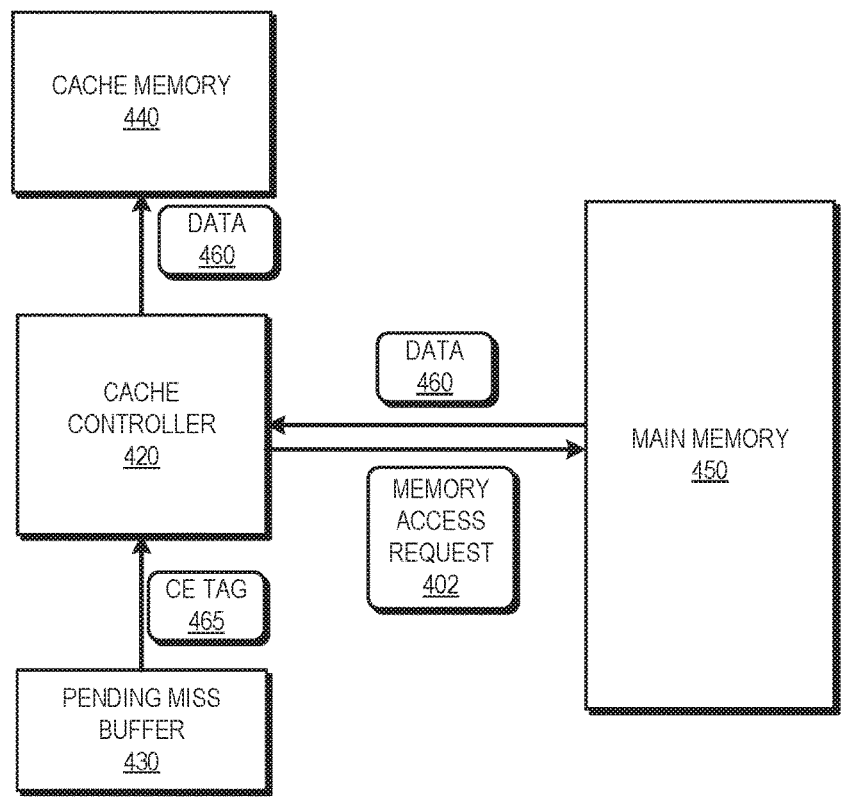
FIG. 4 is a block diagram of an example of the processing system of FIG. 1 fetching data from main memory and storing the data at a cache entry indicated by a cache entry tag from a pending miss buffer in accordance with some embodiments.

FIG. 4 illustrates an example of the cache controller 420 issuing a memory access request 402 to main memory 450, copying the requested data 460 from the main memory address at which the data 460 is stored in main memory 450, and storing the data 460 at the cache entry (not shown) in cache memory 440 indicated by the cache entry tag 465 stored in the pending miss buffer 430. In response to a memory access request 402, the main memory 450 retrieves the cache line at the main memory address targeted by the request 402 and provides the data 460 to the cache controller 420. The cache controller 420 compares the data index of the data 460 to the cache entry tags stored in the pending miss buffer 430. When the cache controller 420 matches the data index of the data 460 to the index of the cache entry tag 465, the cache controller 420 reads the cache entry from the cache entry tag 465. The cache controller 420 stores the data 460 at the location in the cache memory 440 that was indicated by the cache entry tag 465. The cache controller 420 updates the status bit of the entry at the cache entry to a valid state, indicating that the data 460 is present in the cache memory 440.

Figure 5:
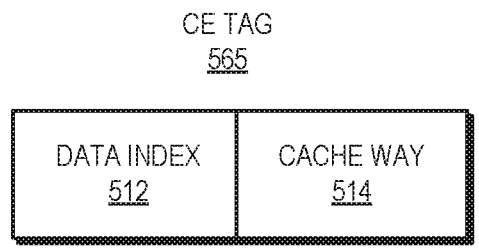
FIG. 5 is a block diagram an example of a cache entry tag stored at the pending miss buffer of FIG. 1 in accordance with some embodiments.

FIG. 5 illustrates an example of a cache entry tag 565. The cache entry tag 565 includes a data index 512 for the cache line that is the subject of a memory access request and the cache way 514 of the cache entry (not shown) assigned to the cache line. The data index 512 includes a subset of the main memory address of the cache line, and is shorter than the full main memory address. The cache way 514 includes the way in the cache memory (not shown) that has been assigned to the cache line that is the subject of a memory access request, and which is temporarily occupied by the miss tag (not shown). The cache entry tag 565 is smaller (requires less storage capacity) than the full main memory address of the cache line that is the subject of the memory access request.

Figure 6:
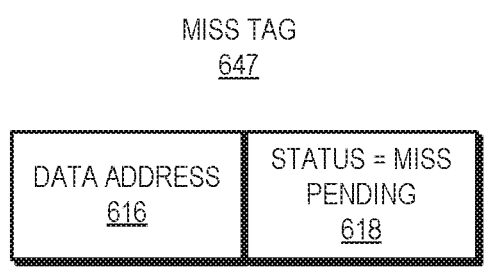
FIG. 6 is a block diagram of an example of a miss tag employed by the processor of FIG. 1 in accordance with some embodiments.

FIG. 6 illustrates an example of a miss tag 647. For a fully-associative cache, the miss tag 647 includes the full main memory address 616 of the cache line that is the subject of a memory access request and a status bit 618, which indicates that the cache line associated with the main memory address 616 is the subject of a pending miss. For a set-associative cache, the miss tag 647 includes a portion of the full main memory address 616 of the cache line that is the subject of a memory access request and a status bit 618, which indicates that the cache line associated with the main memory address 616 is the subject of a pending miss.

Figure 7:
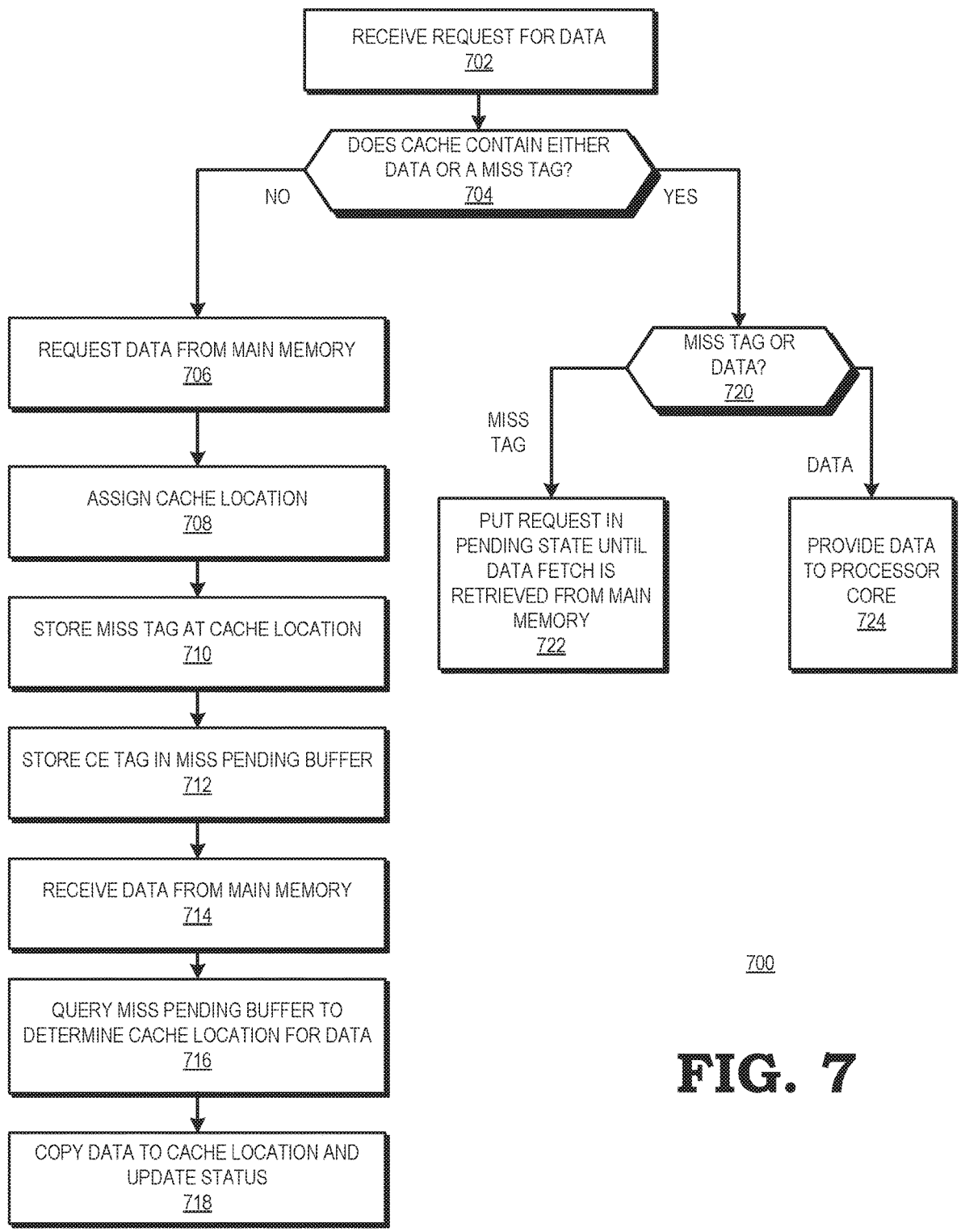
FIG. 7 is a flow chart of a method of indicating the pendency of a memory access request at a cache entry in accordance with some embodiments.

FIG. 7 illustrates a method 700 of handling subsequent memory access requests for data that is already the subject of a pending memory access request. At block 702, the cache controller receives a request for data. At block 704, the cache controller searches the cache memory for the requested data, and determines whether the data is present in the cache memory or a miss tag for the requested data is present in the cache memory.

If neither the requested data nor a miss tag for the requested data is present in the cache memory, at block 706, the cache controller sends a memory access request to main memory to fetch the requested data from main memory. At block 708, the cache controller assigns a cache entry to the requested data. At block 710, the cache controller generates a miss tag including the main memory address of the requested data and a status bit indicating that the data is the subject of a cache miss and stores the miss tag at the cache entry. At block 712, the cache controller generates a cache entry tag including the index for the requested data and the assigned cache entry, and stores the cache entry tag in the miss pending buffer. At block 714, the cache controller receives the requested data from main memory. At block 716, the cache controller queries the miss pending buffer for a cache entry tag matching the data index of the requested data and reads the cache entry information from the cache entry tag. At block 718, the cache controller copies the requested data to the cache entry specified in the cache entry tag and updates the status bit for the cache entry to a valid state.

Returning to block 704, if the cache controller searches the cache memory for the requested data and determines that the cache memory contains either a miss tag corresponding to the requested data or that it contains the requested data, at block 720, the cache controller determines whether the cache entry for the requested data is a miss tag or the requested data. If the cache entry contains a miss tag for the requested data, at block 722, the cache controller treats the miss tag as it would a cache hit that had already been copied to the processor, and continues executing other instructions pending the memory access request for the requested data. If, at block 720, the cache controller determines that the cache entry for the requested data contains the requested data, at block 724 the cache controller copies the requested data to the processor.

In some embodiments, certain aspects of the techniques described above may implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
  in response to a cache miss for a first request for first data at a cache, assigning, by a processor, a cache entry of the cache to store the first data;
  while the first data is being retrieved from a different level of a memory subsystem to the cache,
    storing an indicator at the cache entry that the first request is pending at the cache, the indicator comprising a main memory address of the first data and a status bit indicating that the first data is the subject of a pending cache miss; and storing an identifier comprising a data index and location information of the cache entry in a buffer;

in response to receiving, at the cache, a second request for the first data while the first data is being retrieved to the cache, reading the indicator at the cache entry;

in response to identifying, based on the indicator, that the first request is pending at the cache, placing the second request for the first data in a pending state until the first data has been retrieved to the cache and treating the second request as a cache hit that has already been copied to the processor; and in response to receiving the first data at the cache, storing the first data at the cache entry based on the identifier.

2. The method of claim 1, wherein the identifier comprises fewer bits than the main memory address of the first data.

3. The method of claim 1, further comprising:
in response to receiving the first data at the cache, accessing the buffer to determine the cache entry in the cache in which to store the first data.

4. The method of claim 1, further comprising:
in response to storing the first data at the cache entry, updating the indicator at the cache entry to indicate that the cache entry stores valid data.

5. The method of claim 1, wherein the identifier comprises an indicator of a set and way of the cache entry.

6. The method of claim 1, wherein the identifier comprises a tag value based on a memory address corresponding to the first data.

7. A method, comprising:
in response to a cache miss at a cache resulting from a first memory access request, providing, by a processor, the first memory access request to a memory to retrieve first data for the cache;

while the first memory access request is pending at the memory, assigning, by the processor, a cache entry of the cache to store the first data;

storing, by the processor, at the cache entry an indicator that the first memory access request is pending at the memory, wherein the indicator is a miss tag comprising a main memory address of the first data being retrieved, and a status bit indicating that the first data is the subject of a pending cache miss;

storing, by the processor, at a buffer an identifier comprising a data index and location information of the cache entry that is to store data responsive to the first memory access request, wherein the identifier stores the miss tag, indicating that the requested first data is already the subject of the first memory access request;

while the first data is being retrieved from the memory, receiving at the cache a second memory access request for the first data;

placing the second memory access request in a pending state and treating the second request as a cache hit that has already been copied to the processor in response to identifying that the first memory access request is pending at the memory based on the indicator stored at the cache entry;

receiving at the cache the first data responsive to the first memory access request;

identifying the cache entry based on the identifier stored at the buffer in response to receiving the first data; and storing the requested first data at the identified cache entry.

8. The method of claim 7, wherein the identifier comprises fewer bits than the main memory address of the first data.

9. The method of claim 8, further comprising:
satisfying the second memory access request in response to the first data being retrieved to the cache in response to the first memory access request.

10. The method of claim 7, further comprising:
in response to receiving the first data at the cache, accessing the buffer to determine the cache entry in the cache in which to store the first data.

11. A processor, comprising:
a cache; and
a cache controller to:
in response to a cache miss responsive to a first request for first data at the cache, assign a cache entry of the cache to store the first data;
issue a memory access request; and
while the first data is being retrieved from a different level of a memory subsystem to the cache,
store an indicator at the cache entry that the first request is pending at the cache, wherein the indicator is a miss tag comprising a main memory address of the first data being retrieved, and a status bit indicating that the first data is the subject of a pending cache miss; and
store an identifier comprising a data index and location information of the cache entry in a buffer;
in response to receiving at the cache a second request for the first data while the first data is being retrieved to the cache, read the indicator at the cache entry;
in response to identifying, based on the indicator, that the first request is pending at the cache, place the second request for the first data in a pending state until the first data has been retrieved to the cache and treat the second request as a cache hit that has already been copied to the processor; and
in response to receiving the first data at the cache, store the first data at the cache entry based on the identifier.

12. The processor of claim 11, wherein the identifier comprises fewer bits than the main memory address of the first data.

13. The processor of claim 12, wherein the cache controller is to:
in response to identifying that the first request is pending at the cache based on the indicator, bypass checking the buffer to determine whether the first data is the subject of a pending miss.

14. The processor of claim 11, wherein the cache controller is to:
in response to receiving the first data, access the buffer to determine the cache entry in the cache at which to store the first data.

15. The processor of claim 11, wherein the cache controller is to:
update the indicator to indicate that the cache entry stores valid data in response to the first data being stored at the cache entry.

16. The processor of claim 11, wherein the identifier comprises an indicator of a set and way of the cache entry.

17. The processor of claim 11, wherein the identifier comprises a tag value based on a memory address corresponding to the first data.

* * * * *